Aug. 26, 1958 J. C. DIEFENBACH 2,848,923

PHOTOGRAPHIC EASEL

Filed June 26, 1956 3 Sheets-Sheet 1

INVENTOR.
JAMES C. DIEFENBACH
BY
ATTORNEY

Aug. 26, 1958 J. C. DIEFENBACH 2,848,923
PHOTOGRAPHIC EASEL
Filed June 26, 1956 3 Sheets-Sheet 2
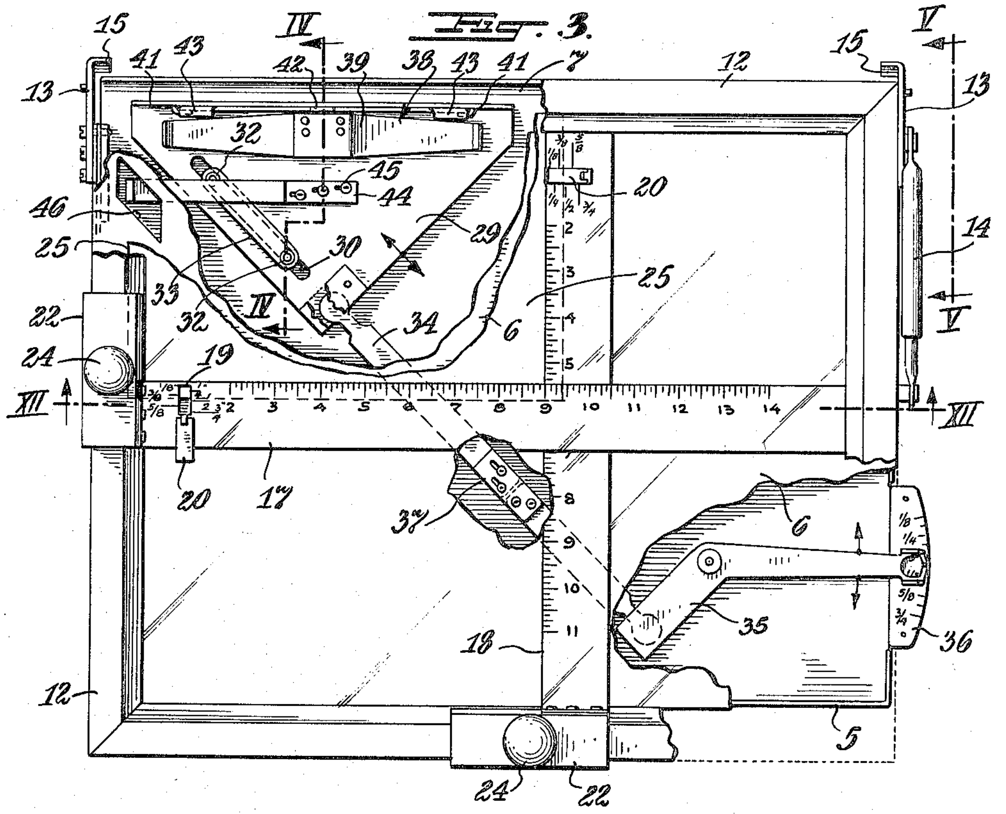
FIG. 3
FIG. 4
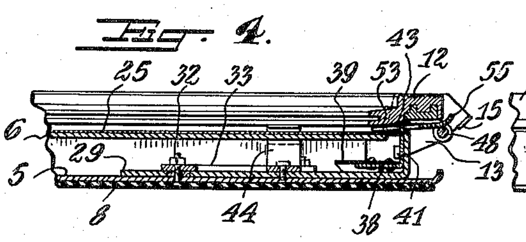
FIG. 5
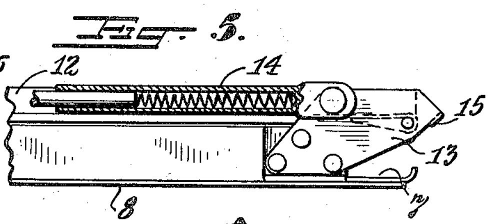
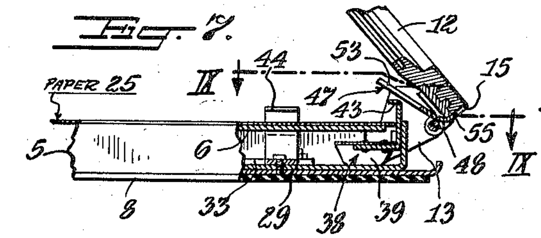
FIG. 7
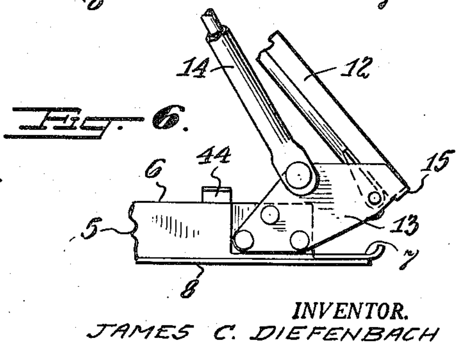
FIG. 6
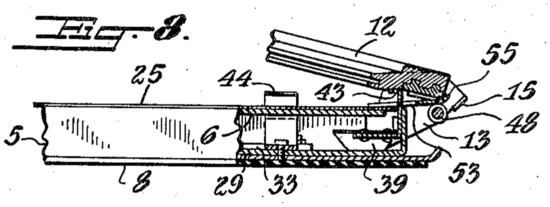
FIG. 8
INVENTOR.
JAMES C. DIEFENBACH
BY [signature]
ATTORNEY.

Aug. 26, 1958 J. C. DIEFENBACH 2,848,923

PHOTOGRAPHIC EASEL

Filed June 26, 1956 3 Sheets-Sheet 3

INVENTOR.
JAMES C. DIEFENBACH
BY
[signature]
ATTORNEY.

United States Patent Office 2,848,923

Patented Aug. 26, 1958

1

2,848,923

PHOTOGRAPHIC EASEL

James C. Diefenbach, New Hyde Park, N. Y., assignor to Simmon Brothers, Inc., Long Island City, N. Y., a corporation of New York Application June 26, 1956, Serial No. 593,979

5 Claims. (Cl. 88—24)

The present invention relates to easels and more particularly to what are known as photographic easels for holding the sensitized paper on which exposures are made from a negative as in the making of photographic enlargements.

Photographic easels have long been known to the art but such easels heretofore have not been dependable so far as accuracy and operating efficiency are concerned and, moreover, they have been of relatively fragile construction with the result that their useful life has also been of relatively short duration.

It is accordingly the primary object of the present invention to provide a photographic easel of sturdy construction which can be readily used with high speed operating efficiency and unvarying accuracy.

Another object of the present invention is the provision of a photographic easel wherein a dual paper gripping is employed to assure that there is no movement of the sensitized paper during the exposure.

Another object of the present invention is the provision of a photographic easel wherein a margin setter is utilized which is always readily visible to the operator.

A further object of the present invention is the provision of a photographic easel wherein windows are provided in the masking bands so that the location of the paper edges can be readily determined by the operator at any time.

Still further objects of the present invention will become obvious to those skilled in the art by reference to the accompanying drawings wherein.

Figures 1, 2, 2A, 15:
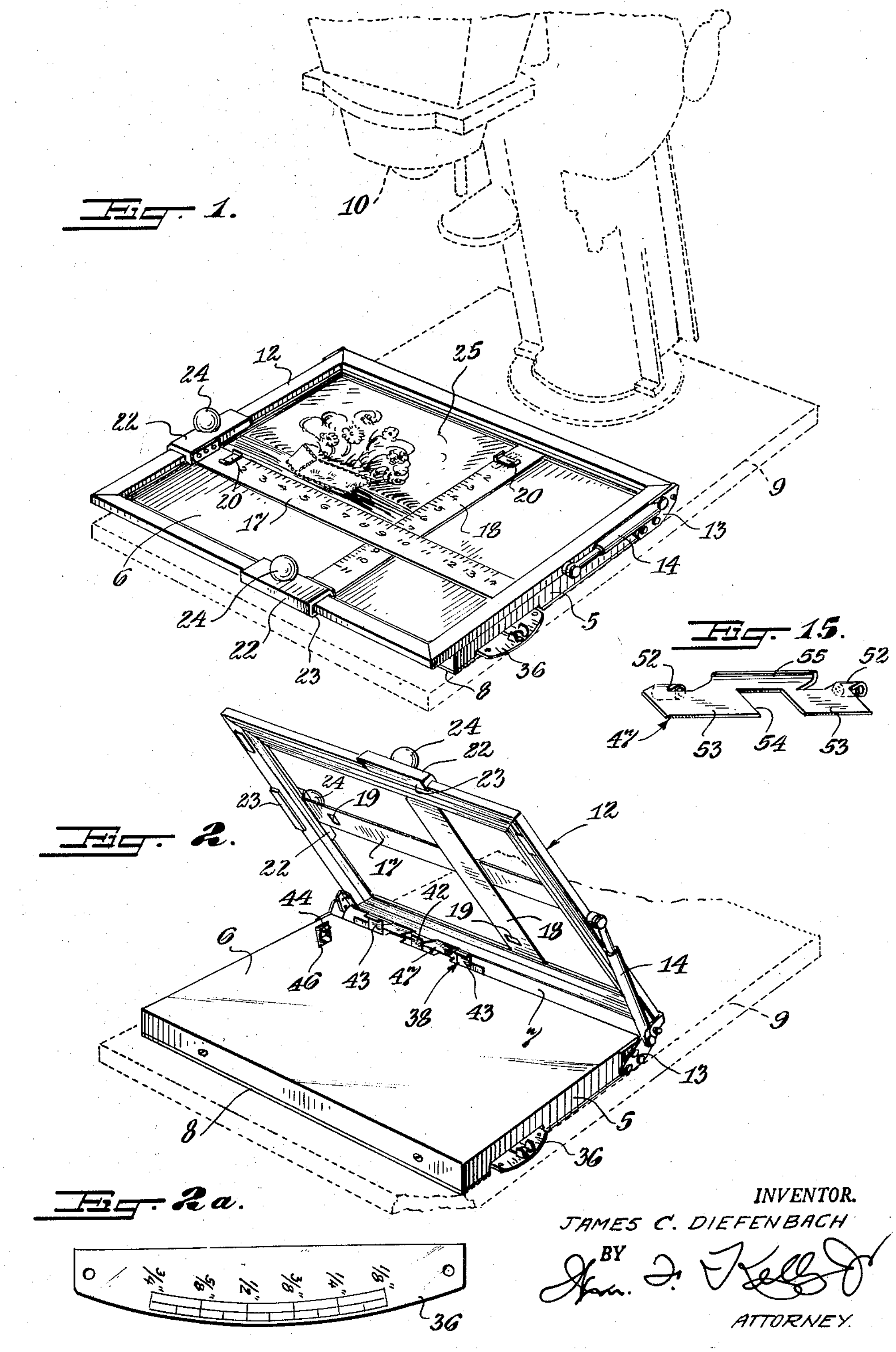
Figure 1 is a perspective view of the photographic easel of the present invention as used with the customary photographic enlarger.
Fig. 2 is a perspective view similar to Fig. 1 but showing only the photographic easel in its open position for loading or removing the exposure.
Figure 9:
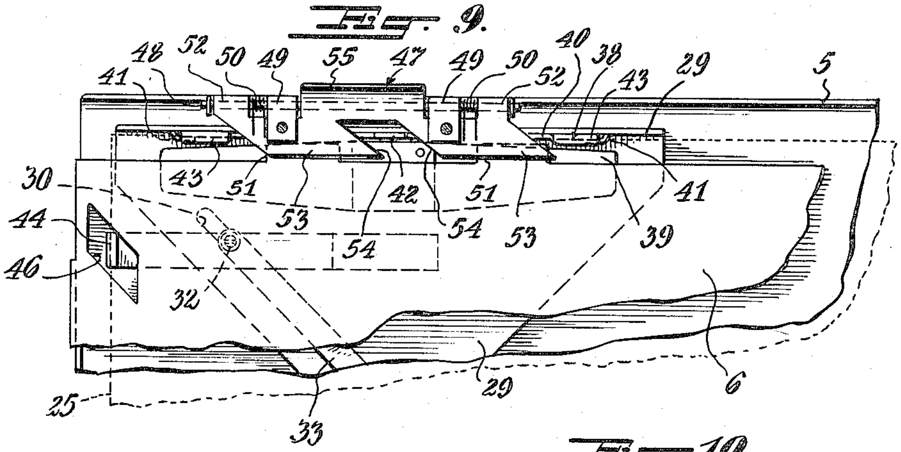
Figure 10:
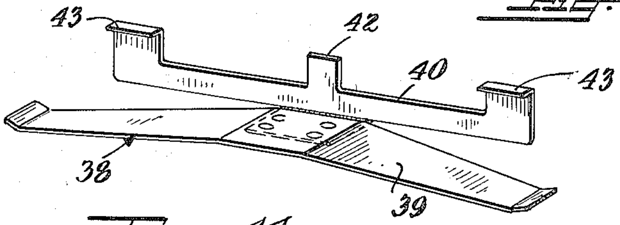

Fig. 2*a* is an enlarged plan view of the side scale carried by the photographic easel as shown in Figs. 1 and 2, Fig. 3 is a top plan view of the photographic easel of the present invention with portions thereof broken away to better illustrate underlying parts, Fig. 4 is a sectional view taken on the line IV—IV of Fig. 3 looking in the direction of the arrows, Fig. 5 is a side elevational view taken on the line V—V of Fig. 3 and looking in the direction of the arrows, Fig. 6 is a fragmentary view similar to Fig. 5 but showing such part in the opened position of the easel, Fig. 7 is a partial sectional view similar to Fig. 4 but with the easel in its opened loading or unloading position with a piece of paper in place, Fig. 8 is a view identical to Fig. 7 except that the easel frame has been partially moved toward its closed position to illustrate how the sensitized paper is initially engaged by the retaining fingers, Fig. 9 is a fragmentary sectional view on an enlarged scale taken on the line IX—IX of Fig. 7 and looking in the direction indicated by the arrows, Fig. 10 is a perspective view on an enlarged scale of one of a pair of the normally spring-biased paper-margin aligners, as shown in Fig. 3,

2

Figures 11, 12, 13:
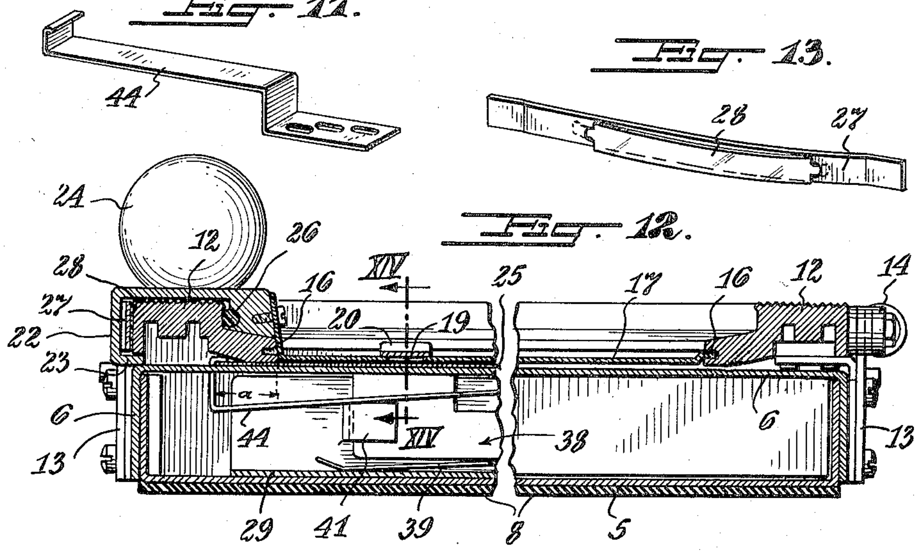
Figure 14:
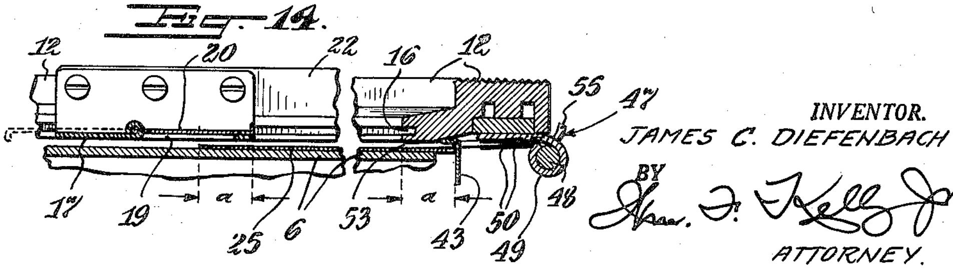

Fig. 11 is a perspective view of the other margin aligner as can be seen in Figs. 3 and 9, Fig. 12 is an enlarged sectional view taken on the line XII—XII of Fig. 3, Fig. 13 is a perspective view of the tensioning spring with retaining shoe for the sliding masking bands, Fig. 14 is a sectional view taken on the line XIV—XIV of Fig. 12, and Fig. 15 is a perspective view of the paper-retaining part of the easel of the present invention.

Accuracy and efficiency is achieved with the photographic easel of the present invention by the provision of adjustable members which may be preset to give the desired size of enlargement with predetermined margin border and, once adjusted, photographic enlargements can thereafter be made in rapid succession while in the dark-room, with assurance that each photograph will be identical in size and have an accurate uniform margin all around.

For a more detailed understanding of the present invention reference may be had to the accompanying drawings showing one embodiment which the present invention may take, wherein the several figures show the easel as comprising a hollow metallic base member 5 of rectangular configuration having a cover plate 6 of slightly less depth than the base, thus leaving a small channel 7 (Fig. 2) extending the full width of the base 5, and the angular sides of the cover 6 extending downwardly and overlapping the upstanding sides of the base, as shown in Fig. 12.

The base 5 has a layer of resilient material, such as soft rubber or the like 8, on its under surface to prevent slippage when the easel is in position on the enlarger platform 9 in proper alignment with the customary enlarging lens and lamp arrangement 10. An open frame member 12 preferably of light metal, such as aluminum, is pivotally connected to a pair of hinge-plates 13 secured at the rear corners of the base 5 and a spring-biased telescopic link 14, connected to the frame 12 and one of the hinge-plates 13, maintains this frame 12 either in its closed position (Figs. 1, 4 and 5) or open position (Figs. 2, 6 and 7) depending upon movement of the frame 12 passed "dead center" of the pivotal connection of the telescopic link 14, with complete opening of the frame 12 being limited by engagement of its rear edge with the inturned angulations 15 (Fig. 3) on the end of each hinge-plate 13 which thus forms a "stop," as can be more readily seen in Figs. 6 and 7. When in its closed position this frame 12, being of somewhat greater depth than the base 5 with its cover 6, extends slightly over the front edge of the base, as seen more particularly in Figs. 2 and 3.

By reference more particularly to Fig. 12 it will be noted that the metallic frame 12 is provided with a small groove 16 in its inwardly extending edge which is engaged by the free end of a masking band 17 and 18 disposed at right angles to each other. As shown more clearly in Fig. 3 each masking band is provided with graduations, in inches and fractions thereof extending longitudinally of the bands, and each band also is provided with lateral graduations in fractions of an inch adjacent a small window 19 that may be opened (band 17—Fig. 3) or closed (band 18—Fig. 3) by a pivoted flat metallic coverplate 20. The end of the masking bands 17 and 18 opposite to the end slidably engaging the groove 16 is secured to a slide-member 22 of channel-like cross-section with a lip 23 thereof passing under the outer edge of the frame 12, as shown in Fig. 12. This slide-member 22 is provided with a knob 24 which can be grasped by the fingers of the operator for movement of the slide, together with its respective integral masking band 17 or 18, along the frame 12 to a desired graduation indicated by the other masking band, thus accurately preselecting the lower and right-hand edges of the photographic field (as viewed from Fig. 3). Also, by opening the windows 19 in each of the masking bands 17 and 18 and aligning the edge of the sensitized paper 25 with the desired adjacent lateral fractional-inch graduation, an accurate selection of the margin for the finished photographic enlargement on these two sides is made, as shown at *a* in Fig. 14.

In the interest of accuracy, by preventing inadvertent movement of the slide member 22 and side-play thereof, a nylon bearing 26 is positioned in an inner longitudinal groove of the slide-member 22 on one side of the frame-side 12 and a leaf-spring 27, carrying a nylon shoe-bearing 28 (Fig. 13), is disposed between the other side of the frame-side 12 and the other inner side of the slide member 22, as shown more particularly in Fig. 12. Accordingly the operator need only grasp the knob 24 and move either of the masking bands 17 or 18, by pushing or pulling the slide-member 22 to the desired position, and the free end of each band will also accurately follow due to its sliding fit in the groove 16 and the entire absence of lost motion in the sliding member 22 because of the spring member 27 and the nylon bearing 26 and shoe 28.

For the purpose of initially setting the desired position of the sensitized paper 25 and preselecting the margin on the other two sides of the finished photographic enlargement (the back and left hand side as viewed in the several figures), the hollow base 5 below the top 6 thereof is provided with an aligning member 29 in the form of a triangle with the apex thereof directed toward the front of the easel. This member 29 has an elongated slot 30 disposed at an angle of 45° relative to the back and left side of the base 5 and top 6 and a pair of spaced studs 32, rigidly secured to the bottom of the base 5 and spaced apart a distance less than the entire length of the slot 30, project upwardly through the latter, with these studs 32 being interconnected by an elongated bar 33 of slightly greater width than that of the slot 30 to thus act as a washer and prevent the aligning member 29 from rising above the studs 32. This aligning member is movable longitudinally of the slot 30, as shown by the arrows in Fig. 3, within the limits of the studs 32 which serve as stops, by a connecting rod or band 34 pivotally connected to the aligning member 29 and to one end of a pivoted bell-crank lever 35 having its free end projecting through mating slots in the base 5 and top 6 and formed as a pointer aligning with graduations (in fractions of an inch) carried by a scale 36 (Fig. 2*a*) secured to the base 5 by screws or the like.

It will also be noted that this connecting band 34 is actually formed in two pieces with an adjustable connection 37 therebetween which is for the sole purpose of accurately setting the mechanism initially at the factory, so that movement of the pointer on the end of the bell-crank lever 35 for any selected graduation of the scale 36 will cause angular movement of the aligning member 29 longitudinally of the 45 degree slot 30 for a distance corresponding precisely to that indicated by the graduation as selected on the scale 36 by the operator. Movement of the pointer thus causes pivotal rotation of the bell-crank lever 35 and the aligning member 29 will accordingly have its rear edge, which is disposed parallel to the back of the easel, moved toward or away from the back edge of the top 6 the same distance *a* for which the masking bands 17 and 18 had been previously set.

A spring-biased margin aligner 38 (Fig. 10) has its base portion 39 resting on the aligning member 29 with its vertical portion 40 secured by a sliding engagement with tongues 41 (Figs. 3, 9 and 12) carried by the vertical edge of said aligning member 29, so that such margin aligner 38 moves in unison along with the aligning member 29 and this upstanding portion 40 is provided with a guide-finger 42 and a pair of inwardly projecting paper-stopping fingers 43. These stopping fingers 43 thus serve to locate the back edge of the sensitized paper 25 (as viewed from Figs. 1, 2, 3 and 9) with their position at any moment depending upon the pointer setting which determines their relationship with respect to the inner edge of the open frame member 12 and establishing the width of the maring (*a* in Fig. 14) for the rear edge (as viewed from Fig. 1) of the photographic enlargement.

The left hand margin is simultaneously determined by a second spring-biased stopping finger 44 (Fig. 11) adjustably secured by set-screws, bolts, or the like 45 (Fig. 3), to the aligning member 29 and extending upwardly through an angularly disposed slot 46 at the top 6 which, like the connector 37 when initially set at the factory should need no further attention, is positioned so that it is angularly moved a precise distance (*a* in Figs. 12 and 14) toward or away from the left hand side of the easel within the slot 46 a distance corresponding precisely to the fraction of an inch selected by movement of the pointer to any desired graduation on the scale 36, and consequently moving at an angle of 45° the same identical distance (*a*—Fig. 12) to the right or left that the fingers 43 are moved (*a*—Fig. 14) away from or toward the rear edge of the easel. Upon closure of the frame 12 when the underside thereof contacts these upstanding angularly projecting fingers 43 and 44 they are pressed downwardly, as can be seen from Figs. 4 and 12, without difficulty due to their spring action.

In order to hold the sensitized paper 25 in its proper position as determined by these stopping fingers 43 and 44 and prevent slippage thereof as these fingers are pressed downwardly by closure of the frame 12, a retaining member 47 (Fig. 15) is journalled on a short shaft 48 secured to the rear side of the frame 12 and held there by suitable lugs 49, as shown in Fig. 9. A pair of coil springs 50 are disposed between the lugs 49 and the bearing portions 52 (having 45° angular sides as seen in Fig. 9) of the retaining member and are so tensioned that the forwardly projecting section 53, with its 45° angular slot 54 substantially encompassing the guide-finger 42, tends to bear against projections 51 on the flat top 6 with the sensitized paper 25 held securely therebetween when the frame 12 is moved a sufficient distance (Fig. 7) toward its closed position and so that this retaining member 47 first engages the paper 25 just prior to the underside of the rear frame side 12 contacting the stopping fingers 43 and 44, as can be seen from Fig. 8. It therefore follows that once the sensitized paper 25 is properly positioned by the operator on the easel top 6 against the stopping fingers 43 and 44, and the frame is moved toward closed position, the retaining member first contacts such paper to hold it firmly against slippage and flat on the easel top 6 before the frame engages the stopping fingers 43 and 44 to press them downwardly under tension until the bent tops thereof are closely adjacent the sensitized paper 25. Since this retaining member 47 is provided with a rearwardly and slightly upwardly projecting portion 55 such portion is contacted by the rear edge of the frame 12 as it is opened and causes sufficient rotation of the retaining member 47 about the shaft 48 and against the tension of the coil springs 50, so that the forwardly projecting portion 53 is raised from the exposed sensitized paper 25 and the stopping fingers 43 and 44 again rise with release of tension, leaving the exposed sensitized paper 25 free to be readily removed for developing and another unexposed sensitized sheet inserted in its place for a new exposure.

It should thus be obvious to those skilled in the art from the foregoing that a photographic easel is herein provided which is of very sturdy construction and which can be used with high speed operating efficiency while in the dark room. Moreover, by presetting the two masking bands carried by the movable frame so as to define two sides of the exposure field and margin of the completed photograph enlargment, they are then retained accurately at such preselected setting without fear of shifting regardless of the number and speed with which additional exposures are made. The same accuracy is likewise maintained in connection with the remaining two sides of the exposure field and the margin, since setting of the margin on the scale by movement of the pointer causes a simultaneous setting of the paper stopping fingers for the back and left hand side which are moved in unison the distance indicated on the scale, as the aligning member is moved at an angle of 45° relative to the easel top.

Although one embodiment of the present invention has been shown and described it is to be understood that still further modifications thereof may be made without departing from the spirit and scope of the appended claims.

I claim:

1. An easel for use in the making of photograph exposures comprising a base member provided with a frame adapted to be opened and closed relative to said base member, an aligning member provided with spring-biased paper-stopping depressible fingers disposed at right angles to each other carried by said base member and movable with respect to the latter to accurately preselect two sides of the exposure field and to simultaneously preselect the marginal width of the finished photograph for said two sides by said depressible fingers, a scale carried by said easel provided with graduations, a pointer movable into registry with any selected graduation on said scale and connected to said aligning member for causing movement of the paper-stopping depressible fingers of said aligning member a distance corresponding to the graduation selected on said scale, masking bars provided with graduations thereon carried by said frame and adjustable relative thereto to accurately preselect the remaining two sides of the exposure field and the marginal width of these remaining two sides of the finished photograph when said frame is closed relative to said base, and said frame being operable upon closure thereof to depress said paper-stopping fingers in opposition to the spring-tension thereof into said base member with the tops of said fingers closely adjacent the sensitized paper carried thereby.

2. An easel for use in the making of photographic exposures comprising a base member provided with a frame adapted to be opened and closed relative to said base member, an aligning member provided with paper-stopping depresible fingers disposed at right angles to each other carried by said base member in one corner thereof and movable at an angle of 45° with respect to said base corner to accurately preselect two sides of the exposure field and to simultaneously preselect the marginal width of the finished photograph for said two sides by said paper-stopping depressible fingers, a scale carried by said easel provided with graduations, a pointer movable into registry with any selected graduation on said scale and connected to said aligning member for causing angular movement of the latter together with movement of said paper-stopping depressible fingers a distance corresponding to the graduation selected on said scale, masking bars provided with graduations thereon carried by said frame and adjustable relative thereto to accurately preselect the remaining two sides of the exposure field and the marginal width of these remaining two sides of the finished photograph when said frame is closed relative to said base, said frame being operable upon closure thereof to depress said paper-stopping fingers in opposition to the spring-tension thereof into said base member with the bent tops of said fingers closely adjacent the sensitized paper carried thereby, and a retaining member operable by the opening and closing of said frame to cause said retaining member to engage the sensitized paper prior to the adjacent positioning of the depressible paper-stopping finger tops therewith to maintain the sensitized paper in a desired position on the top of said base member during the making of a photographic exposure.

3. An easel for use in the making of photographic exposures comprising a base member provided with a frame adapted to be opened and closed relative to said base member, an aligning member provided with paper-stopping depressible fingers disposed at right angles to each other carried by said base member in one corner thereof and movable at an angle of 45° with respect to said base corner to accurately preselect two sides of the exposure field and to simultaneously preselect the marginal width of the finished photograph for said two sides by said paper-stopping depressible fingers, a scale carried by said easel provided with graduations, a pointer movable into registry with any selected graduation on said scale and connected to said aligning member for causing angular movement of the latter together with movement of said paper-stopping depressible fingers a distance corresponding to the graduation selected on said scale, masking bars provided with graduations thereon carried by said frame and adjustable relative thereto to accurately preselect the remaining two sides of the exposure field and the marginal width of these remaining two sides of the finished photograph when said frame is closed relative to said base, said frame being operable upon closure thereof to depress said paper-stopping fingers in opposition to the spring-tension thereof into said base member with the tops of said fingers closely adjacent the sensitized paper carried thereby, and a retaining member carried by said easel spring-biased for rotation toward the top of said base member and having a projecting section to overlie said top and operable by the opening and closing of said frame to cause the projecting section of said retaining member to engage the sensitized paper prior to the adjacent positioning of said depressible paper-stopping finger tops therewith to maintain the sensitized paper in a desired position on the top of said base member during the making of a photographic exposure.

4. An easel for use in the making of photographic exposures comprising a base member provided with a frame adapted to be opened and closed relative to said base member, an aligning member provided with spring-biased depressible fingers disposed at right angles to each other carried by said base member and movable with respect thereto to accurately preselect two sides of the exposure field and to simultaneously preselect the marginal width of the finished photograph for said two sides by said depressible fingers, a scale carried by said easel provided with graduations, a pointer movable into registry with any selected graduation on said scale and connected to said aligning member for causing movement of the latter a distance corresponding to the graduation selected on said scale, masking bars provided with graduations thereon carried by said frame and adjustable relative thereto to accurately preselect the remaining two sides of the exposure field of the finished photograph when said frame is closed relative to said base, said frame being operable upon closure thereof to depress said paper-stopping fingers against the spring-bias thereof into said base member with the tops of said fingers closely adjacent the sensitized paper carried thereby, a window in each of said masking bars having adjacent graduations for preselecting the marginal width of the remaining two sides of the finished photograph, a retaining member operable by the opening and closing of said frame to cause said retaining member to engage the sensitized paper prior to the adjacent positioning of the depressible paper-stopping finger tops therewith to maintain the sensitized paper in a desired position on the top of said base member during the making of a photographic exposure.

5. An easel for use in the making of photographic exposures ocmprising a base member provided with a frame adapted to be opened and closed relative to said base member, an aligning member provided with spring-biased paper-stopping depressible fingers disposed at right angles to each other carried by said base member and movable with respect to the latter to accurately preselect two sides of the exposure field and to simultaneously preselect the marginal width of the finished photograph for said two sides by said depressible fingers, a scale carried by said easel provided with graduations, a pointer movable into registry with any selected graduation on said scale and connected to said aligning member for causing movement of the paper-stopping depressible fingers of said aligning member a distance corresponding to the graduation selected on said scale, masking bars provided with graduations thereon carried by said frame and adjustable relative thereto to accurately preselect the remaining two sides of the exposure field of the finished photograph when said frame is closed relative to said base, said frame being operable upon closure thereof to depress said paper-stopping fingers in opposition to the spring-tension thereof into said base member with the bent tops of said fingers closely adjacent the sensitized paper carried thereby, a window in each of said masking bars having adjacent graduations for preselecting the marginal width of the remaining two sides of the finished photograph, and a retaining member carried by said easel spring-biased for rotation toward the top of said base member and having a projecting portion to overlie said top and operable by the opening and closing of said frame to cause the projecting portion of said retaining member to engage the sensitized paper prior to the adjacent positioning of said depressible paper-stopping finger tops therewith to maintain the sensitized paper in a desired position on the top of said base member during the making of a photographic exposure.

References Cited in the file of this patent

UNITED STATES PATENTS

| | | |
|---|---|---|
| 2,084,432 | Clear | June 22, 1937 |
| 2,199,304 | Dewey | Apr. 30, 1940 |
| 2,250,309 | Lary | July 22, 1941 |
| 2,412,507 | Hunter | Dec. 10, 1946 |
| 2,660,919 | Keinath | Dec. 1, 1953 |